US010642349B2

(12) United States Patent
Kake et al.

(10) Patent No.: US 10,642,349 B2
(45) Date of Patent: May 5, 2020

(54) INFORMATION PROCESSING APPARATUS (71) Applicant: SONY INTERACTIVE ENTERTAINMENT INC., Tokyo (JP)

(72) Inventors: Tomokazu Kake, Tokyo (JP); Tsutomu Kouno, Tokyo (JP); Hiroya Matsugami, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 15/568,898

(22) PCT Filed: Dec. 15, 2015

(86) PCT No.: PCT/JP2015/085059
§ 371 (c)(1),
(2) Date: Oct. 24, 2017

(87) PCT Pub. No.: WO2016/185634
PCT Pub. Date: Nov. 24, 2016

(65) Prior Publication Data
US 2018/0101226 A1 Apr. 12, 2018

(30) Foreign Application Priority Data

May 21, 2015 (JP) ................................ 2015-103764

(51) Int. Cl.
G06F 3/01 (2006.01)
G06F 1/16 (2006.01)
(Continued)

(52) U.S. Cl.
CPC .............. G06F 3/012 (2013.01); G06F 1/163 (2013.01); G06F 3/011 (2013.01); G06F 3/017 (2013.01);
(Continued)

(58) Field of Classification Search
CPC .......... G06F 1/163; G06F 3/005; G06F 3/011; G06F 3/012; G06F 3/017; G06F 3/0304;
(Continued)

(56) References Cited

U.S. PATENT DOCUMENTS 6,630,915 B1* 10/2003 Flood .................. G02B 27/017
345/8
2003/0142067 A1* 7/2003 Kurtenbach ....... G02B 27/2271
345/156
(Continued)

FOREIGN PATENT DOCUMENTS

JP 2003131785 A 5/2003
JP 2013218535 A 10/2013

OTHER PUBLICATIONS

International Search Report and Written Opinion dated Feb. 23, 2016, from the corresponding PCT/JP2015/085059.
(Continued)

Primary Examiner — Michael J Eurice
(74) Attorney, Agent, or Firm — Katten Muchin Rosenman LLP (57) ABSTRACT An information processing apparatus is provided that allows a user to execute, when a video image is displayed on a video image display apparatus worn on the head of the user, interactions with video images more intuitively. An information processing apparatus 10, connected to a video image display apparatus 40 worn on the head of a user, acquires information of a relative position of at least a part of the body of the user with reference to a position of the video image display apparatus 40 and displays, on the video image display apparatus 40, a video image indicative of a situation in which an object corresponding to the part is arranged at a position in a virtual space, the position being determined in accordance with the acquired relative position.

7 Claims, 5 Drawing Sheets (51) Int. Cl.
*G06F 3/03* (2006.01)
*G09G 5/38* (2006.01)
*G06F 3/00* (2006.01)
*G06F 3/0481* (2013.01)

(52) U.S. Cl.
CPC .......... *G06F 3/0304* (2013.01); *G06F 3/0325* (2013.01); *G09G 5/38* (2013.01); *G06F 3/005* (2013.01); *G06F 3/04815* (2013.01); *G09G 2354/00* (2013.01)

(58) Field of Classification Search
CPC ..... G06F 3/0325; G06F 3/04815; G09G 5/38; G09G 2354/00
See application file for complete search history.

(56) References Cited

U.S. PATENT DOCUMENTS

| | | | | |
|---|---|---|---|---|
| 2005/0105772 | A1* | 5/2005 | Voronka | G06F 3/017 382/103 |
| 2005/0264527 | A1* | 12/2005 | Lin | G06F 3/011 345/156 |
| 2008/0183030 | A1* | 7/2008 | Shiri | A63F 13/10 600/27 |
| 2009/0027337 | A1* | 1/2009 | Hildreth | G06F 3/011 345/158 |
| 2009/0077504 | A1* | 3/2009 | Bell | G06F 3/011 715/863 |
| 2010/0208942 | A1* | 8/2010 | Porter | H04N 13/122 382/106 |
| 2010/0315413 | A1* | 12/2010 | Izadi | G06F 3/017 345/419 |
| 2011/0107216 | A1* | 5/2011 | Bi | G06F 3/011 715/716 |
| 2011/0181601 | A1* | 7/2011 | Mumbauer | G06F 3/011 345/473 |
| 2011/0304632 | A1* | 12/2011 | Evertt | G06F 3/011 345/474 |
| 2012/0062558 | A1* | 3/2012 | Lee | G06F 3/017 345/419 |
| 2012/0117514 | A1* | 5/2012 | Kim | G06F 3/011 715/849 |
| 2012/0139914 | A1* | 6/2012 | Jeon | G06T 19/006 345/419 |
| 2012/0188279 | A1* | 7/2012 | Demaine | A63F 13/10 345/633 |
| 2012/0216151 | A1* | 8/2012 | Sarkar | G06F 3/04883 715/863 |
| 2012/0223885 | A1* | 9/2012 | Perez | G06F 3/011 345/158 |
| 2012/0249528 | A1* | 10/2012 | Park | G06T 19/006 345/419 |
| 2012/0262558 | A1* | 10/2012 | Boger | G02B 27/0093 348/61 |
| 2012/0268376 | A1* | 10/2012 | Bi | G06F 3/0425 345/168 |
| 2013/0035612 | A1* | 2/2013 | Mason | A61B 5/1124 600/595 |
| 2013/0050069 | A1* | 2/2013 | Ota | G06F 3/011 345/156 |
| 2013/0127980 | A1* | 5/2013 | Haddick | G06F 3/013 348/14.08 |
| 2013/0346168 | A1* | 12/2013 | Zhou | G06F 1/163 705/14.4 |
| 2014/0002444 | A1* | 1/2014 | Bennett | G06F 3/012 345/419 |
| 2014/0098018 | A1* | 4/2014 | Kim | G06F 3/014 345/156 |
| 2014/0104274 | A1* | 4/2014 | Hilliges | G06F 3/011 345/424 |
| 2014/0240218 | A1* | 8/2014 | Scalais | H04N 13/366 345/156 |
| 2014/0375539 | A1* | 12/2014 | Gabara | G06F 3/0304 345/156 |
| 2015/0054734 | A1* | 2/2015 | Raghoebardajal | G06F 3/017 345/156 |
| 2015/0062000 | A1* | 3/2015 | Saito | G02B 27/017 345/156 |
| 2015/0070347 | A1* | 3/2015 | Hofmann | G06K 9/00208 345/419 |
| 2015/0352437 | A1* | 12/2015 | Koseki | A63F 13/212 463/31 |
| 2016/0025983 | A1* | 1/2016 | Ikeda | G02B 27/0172 345/173 |
| 2016/0026253 | A1* | 1/2016 | Bradski | G02B 27/225 345/8 |
| 2016/0140764 | A1* | 5/2016 | Bickerstaff | G02B 27/017 345/633 |
| 2016/0166930 | A1* | 6/2016 | Brav | F41A 33/00 463/30 |
| 2016/0225188 | A1* | 8/2016 | Ruddell | G06T 19/006 |
| 2016/0246384 | A1* | 8/2016 | Mullins | G06F 3/017 |
| 2017/0295357 | A1* | 10/2017 | Yang | H04M 1/72527 |
| 2018/0262743 | A1* | 9/2018 | Casas | H04N 13/296 |

OTHER PUBLICATIONS

International Preliminary Report on Patentability dated Nov. 21, 2017, from the corresponding PCT/JP2015/085059.

* cited by examiner

INFORMATION PROCESSING APPARATUS

TECHNICAL FIELD

The present invention relates to an information processing apparatus, a video image display method, an information processing apparatus control program, and an information storage medium for having a video image display apparatus worn on the head of a user display a video image.

BACKGROUND ART

For example, video image display apparatuses such as head-mounted displays and smart glasses are known that are used by users by wearing around the heads. These video image display apparatuses form images in front of the eyes of each user to let the user view the formed image. These video image display apparatuses can let users view video images of more realistic feeling, so that these apparatuses are for use in virtual reality technologies and so on.

SUMMARY

Technical Problem

In displaying video images that are interactive with a user by use of a video image display apparatus described above (namely, video images whose content can be changed by the user executing some actions), it is desired that the user can execute interactions with video images more intuitively.

The present invention has been made in consideration of the above-mentioned circumstances, and an object of the present invention is to provide an information processing apparatus, a video image display method, an information processing apparatus control program, and an information storage medium that allow a user to execute, when a video image is displayed on a video image display apparatus worn on the head of the user, interactions with video images more intuitively.

Solution to Problem

According to the present invention, there is provided an information processing apparatus connected to a video image display apparatus worn on a head of a user. This information processing apparatus includes a position acquisition block configured to acquire information of a relative position of at least a part of a body of the user with reference to a position of the video image display apparatus, and a display control block configured to display, on the video image display apparatus, a video image indicative of a situation in which an object corresponding to the part is arranged at a position in a virtual space, the position being determined in accordance with the acquired relative position.

According to the present invention, there is provided a video image display method for having a video image display apparatus worn on a head of a user display a video image. This video image display method includes a step of acquiring information of a relative position of at least a part of a body of the user with reference to a position of the video image display apparatus, and a step of displaying, on the video image display apparatus, a video image indicative of a situation in which an object corresponding to the part is arranged at a position in a virtual space, the position being determined in accordance with the acquired relative position.

According to the present invention, there is provided a program for causing a computer connected to a video image display apparatus worn on a head of a user to function as a position acquisition block configured to acquire information of a relative position of at least a part of a body of the user with reference to a position of the video image display apparatus, and a display control block configured to display, on the video image display apparatus, a video image indicative of a situation in which an object corresponding to the part is arranged at a position in a virtual space, the position being determined in accordance with the acquired relative position. This program may be provided as stored in a computer-readable, non-temporary information storage medium.

DESCRIPTION OF EMBODIMENTS

The following describes embodiments of the present invention in detail with reference to the drawings.

Figure 1:
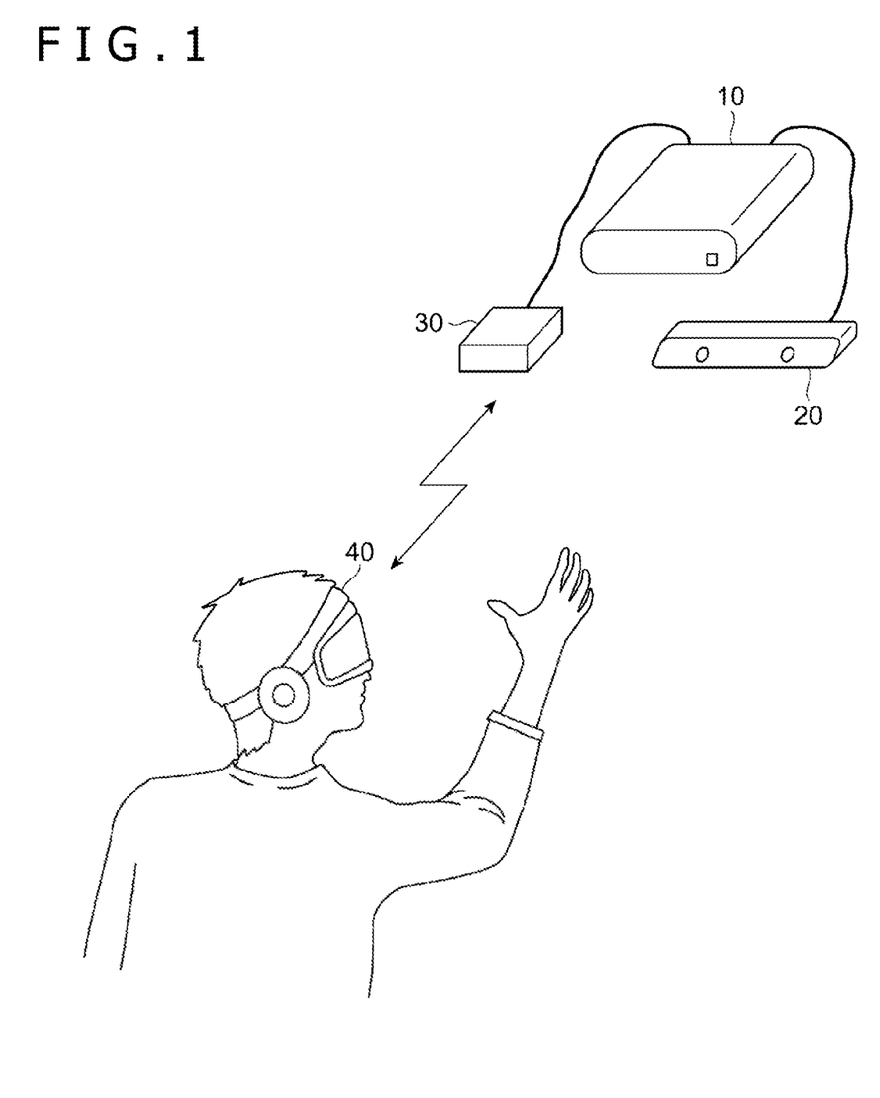
FIG. 1 is a schematic diagram illustrating an entire video image display system that includes an information processing apparatus practiced as one embodiment of the present invention.
Figure 2:
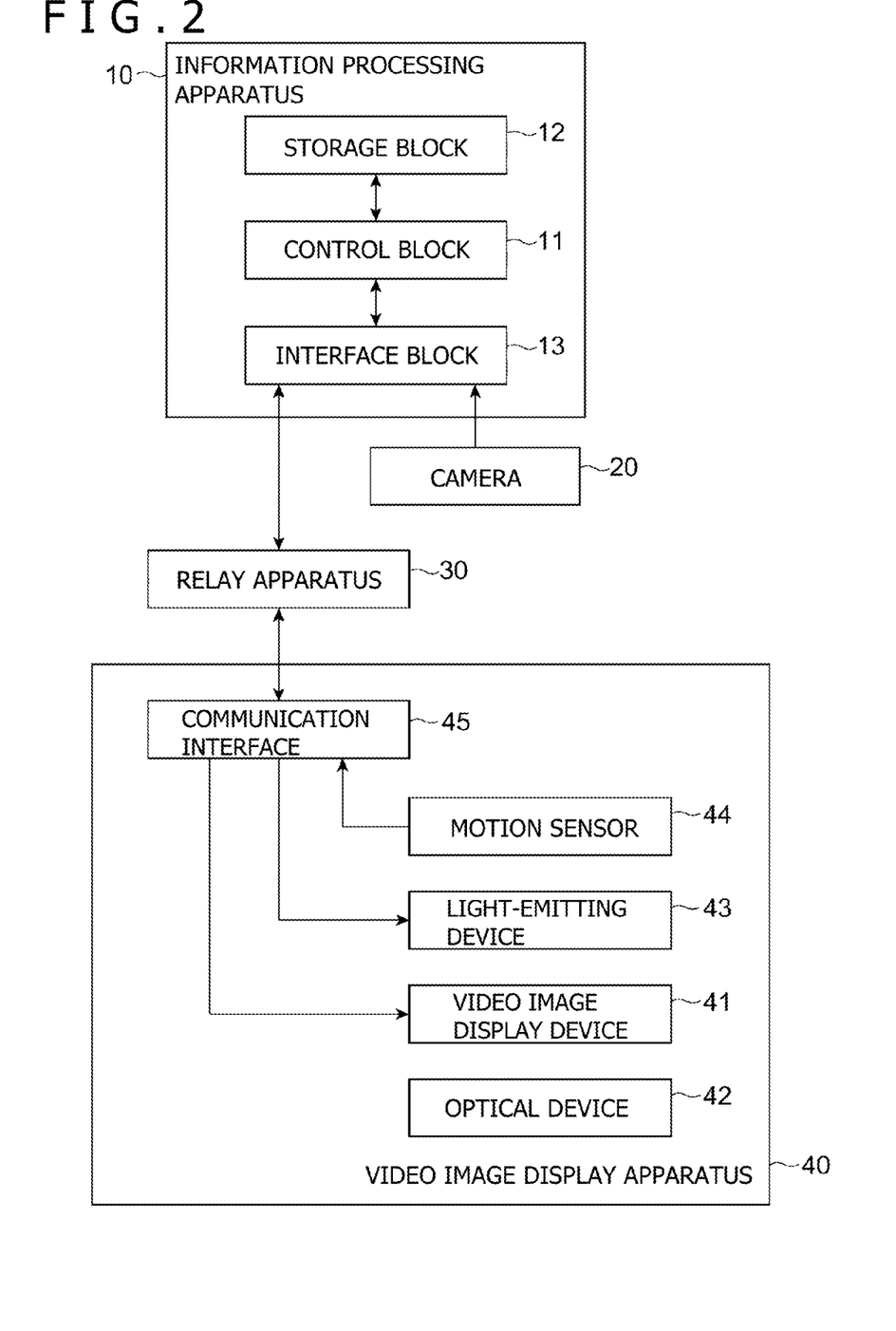
FIG. 2 is a configurational block diagram illustrating a configuration of the video image display system.

Now, referring to FIG. 1, there is depicted a schematic diagram illustrating an entire video image display system 1 that includes an information processing apparatus 10 practiced as one embodiment of the present invention. FIG. 2 is a configurational block diagram illustrating a configuration of the video image display system 1. As depicted in these diagrams, the video image display system 1 has the information processing apparatus 10, a camera 20, a relay apparatus 30, and a video image display apparatus 40.

The information processing apparatus 10 is an apparatus configured to supply video images that are to be displayed on the video image display apparatus 40 and may be a home game machine, a portable game machine, a personal computer, a smartphone, a tablet, or the like. As depicted in FIG. 2, the information processing apparatus 10 includes a control block 11, a storage block 12, and an interface block 13.

The control block 11 is a central processing unit (CPU) or the like and executes programs stored in the storage block 12 so as to execute various kinds of information processing. It should be noted that specific examples of the processing to be executed by the control block 11 in the present embodiment will be described later. The storage block 12 includes a memory device such as a random access memory (RAM) and stores programs to be executed by the control block 11 and data to be processed by these programs.

The interface block 13 is an interface for data communication with the camera 20 and the relay apparatus 30. The information processing apparatus 10 is connected to the camera 20 and the relay apparatus 30 through the interface block 13 in a wired or wireless manner. For a specific example, in order to transmit video images and audio supplied from the information processing apparatus 10 to the relay apparatus 30, the interface block 13 may include a multimedia interface such as High-Definition Multimedia Interface (HDMI) (registered trademark). In addition, in order to receive various kinds of information from the video image display apparatus 40 and send control signals and so on thereto through the relay apparatus 30, the interface block 13 may include a data communication interface such as Universal Serial Bus (USB). Further, in order to receive image data taken by the camera 20, the interface block 13 includes a data communication interface such as USB.

Figure 3:
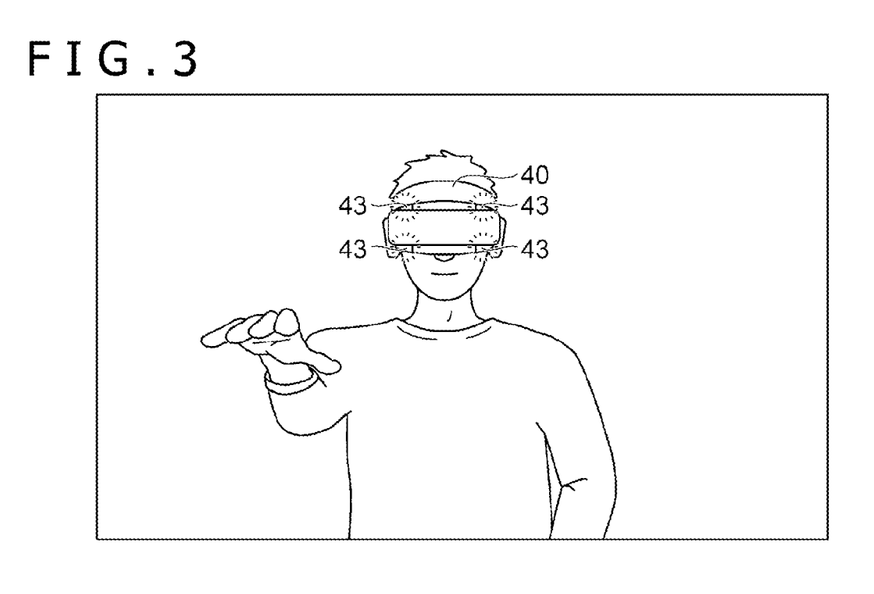
FIG. 3 is a diagram illustrating one example of a taken image captured with a camera.

The camera 20 is arranged in front of a user who uses the video image display system 1 to take video images of the user and surroundings thereof. FIG. 3 illustrates one example of a taken image captured with the camera 20. Especially, in the present embodiment, it assumed that the camera 20 be a stereo camera that includes two image sensing devices arranged as separated from each other by a predetermined distance. Analyzing a difference (a parallax) between the images simultaneously taken with these two image sensing devices allows the information processing apparatus 10 to measure a distance to an object that exists within the field of vision of the camera 20. That is, in the present embodiment, the camera 20 functions as a distance image sensor that is capable of detecting the distance to an object existing within a range of field of vision. To be more specific, the information processing apparatus 10 analyzes the two images taken by the camera 20 so as to generate a distance image D (a depth map). The distance image D includes two or more pixels and is an image in which a value indicative of a distance to an object captured in each pixel is set as a pixel value of the pixel concerned.

The relay apparatus 30 is connected to the video image display apparatus 40 in a wired or wireless manner and, upon reception of video image data supplied from the information processing apparatus 10, outputs a video image signal corresponding to the received data to the video image display apparatus 40. At this moment, the relay apparatus 30 may execute correction processing and the like on a distortion caused by an optical system of the video image display apparatus 40 and output the corrected video image signal, as required. It should be noted that a video image signal supplied from the relay apparatus 30 to the video image display apparatus 40 includes two video images, one for the left eye and the other for the right eye. Further, in addition to video image data, the relay apparatus 30 relays various kinds of information that are transferred between the information processing apparatus 10 and the video image display apparatus 40, such as audio data and control signals.

The video image display apparatus 40 is a video image display apparatus used by a user wearing on the head and displays a video image corresponding to a video image signal entered from the relay apparatus 30 for viewing by the user. In the present embodiment, the video image display apparatus 40 is compatible with the viewing of video images with both eyes and therefore it is assumed that the video images be displayed in front of the right eye and the left eye of the user independently from each other. As depicted in FIG. 2, the video image display apparatus 40 includes a video image display device 41, an optical device 42, a light-emitting device 43, a motion sensor 44, and a communication interface 45.

The video image display device 41 is an organic electroluminescence (EL) display panel or a liquid crystal display panel, for example, and displays a video image corresponding to a video image signal supplied from the relay apparatus 30. In the present embodiment, the video image display device 41 displays two video images, one for the left eye and the other for the right eye. It should be noted that the video image display device 41 may be configured by one display device that displays a left-eye video image and a right-eye video image in alignment or two display devices arranged independently for the left eye and the right eye. Further, a known smartphone or the like may be used as the video image display device 41. It should be noted that the video image display device 41 may display different video images for a left-eye video image and a right-eye video image so as to realize a stereoscope vision or display same video images for a left-eye video image and a right-eye video image.

The optical device 42 is a hologram, a prism, or a half mirror, for example, that is arranged in front of the eyes of the user so as to transmit or refract the light of a video image displayed by the video image display device 41, thereby making the transmitted or refracted light incident on the left eye and the right eye of the user. To be more specific, the video image for the left eye displayed by the video image display device 41 is made incident on the left eye of the user through the optical device 42 and the video image for the right eye is made incident on the right eye of the user through the optical device 42. Consequently, the user is able to view the left-eye video image with the left eye and the right-eye video image with the right eye with the video image display apparatus 40 worn on the head. It is assumed in the present embodiment that the video image display apparatus 40 be of a non-transmission type that the user cannot visually recognize the outside of the video image display apparatus 40.

The light-emitting device 43 is a light emitting diode (LED) or the like and arranged on the front surface of the video image display apparatus 40 so as to emit light as instructed by the information processing apparatus 10. Taking the light from the light-emitting device 43 with the camera 20 allows the information processing apparatus 10 to recognize the position of the video image display apparatus 40 inside the field of vision of the camera 20. That is, the information processing apparatus 10 is capable of tracking the video image display apparatus 40 by use of the light from the light-emitting device 43. It should be noted that a plurality of light-emitting devices 43 may be provided.

The motion sensor 44 measures various kinds of information related with the position, orientation, and movement of the video image display apparatus 40. For example, the motion sensor 44 may include an acceleration sensor, a gyroscope, or a geomagnetic sensor. The results of the measurement by the motion sensor 44 are transmitted to the information processing apparatus 10 through the relay apparatus 30. In order to identify the change in the movement and orientation of the video image display apparatus 40, the information processing apparatus 10 can use the measurement results of the motion sensor 44. To be more specific, use of the detection results of the acceleration sensor allows the detection of the tilt and translation relative to the perpendicular direction of the video image display apparatus 40. In addition, use of the gyroscope or the geomagnetic sensor allows the detection of the rotary motion of the video image display apparatus 40.

The communication interface 45 is an interface for data communication with the relay apparatus 30. For example, if the video image display apparatus 40 executes data transmission and reception in a wireless manner such as wireless local area network (LAN) or Bluetooth (registered trademark) with the relay apparatus 30, the communication interface 45 includes an antenna for communication and a communication module.

Figure 4:
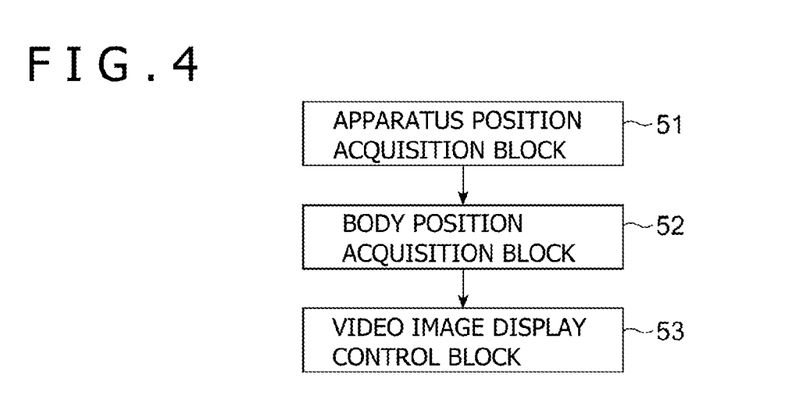
FIG. 4 is a functional block diagram illustrating functions of the information processing apparatus.

The following describes functions to be realized by the information processing apparatus 10 with reference to FIG. 4. As depicted in FIG. 4, the information processing apparatus 10 functionally includes an apparatus position acquisition block 51, a body position acquisition block 52, and a video image display control block 53. These functions are realized by executing, by the control block 11, programs stored in the storage block 12. These programs may be provided to the information processing apparatus 10 via a communication network such as the Internet or in a computer-readable information storage medium such as an optical disc.

The apparatus position acquisition block 51 acquires the information about the position of the video image display apparatus 40 in a real space. In addition, it is assumed that the apparatus position acquisition block 51 also acquire the orientation of the video image display apparatus 40. To be more specific, the position of the video image display apparatus 40 is identified by analyzing an image obtained by taking the light from the light-emitting device 43 with the camera 20 as described above. Since the camera 20 functions as a distance image sensor, analyzing a taken image captured by the camera 20 allows the identification of a distance from the mounting position of the camera 20 up to a position at which the light from the light-emitting device 43 is pictured. The apparatus position acquisition block 51 is capable of computing a three-dimensional position of the video image display apparatus 40 with reference to the mounting position of the camera 20 by use of a position of the light from the light-emitting device 43 inside the distance image D and a distance up to the position of this light. Further, in order to identify the position of the video image display apparatus 40, the apparatus position acquisition block 51 may use the results of measurement by the motion sensor 44 built in the video image display apparatus 40. Combining a taken image captured by the camera 20 with the measurement results of the motion sensor 44 allows the apparatus position acquisition block 51 to more accurately identify the position of the video image display apparatus 40. In addition, not only the position coordinate in the real space but also the orientation of the video image display apparatus 40 can be identified accurately. The information of the position and orientation of the video image display apparatus 40 acquired by the apparatus position acquisition block 51 corresponds to the position and orientation of the head of the user.

It should be noted that, in the description made above, the apparatus position acquisition block 51 itself identifies the position and orientation of the video image display apparatus 40; however, it is also practicable for the apparatus position acquisition block 51 to acquire the information of the position and orientation of the video image display apparatus 40 that are computed by an external apparatus.

The body position acquisition block 52 acquires the information of a relative position of at least one part of the body of a user with reference to the position of the video image display apparatus 40. It should be noted that, in what follows, a part of the user body whose positional information is to be acquired by the body position acquisition block 52 is referred to as a part of attention. To be more specific, the body position acquisition block 52 first identifies the position of a part of attention as viewed from the camera 20 by use of a distance image D that is obtained by the camera 20. Next, by use of the information of position and orientation of the video image display apparatus 40 acquired by the apparatus position acquisition block 51, the identified position of the part of attention is converted into a position in the coordinate system with reference to the video image display apparatus 40. Consequently, the relative position of the part of attention as viewed from the video image display apparatus 40 is computed.

In the present system, the camera 20 is mounted such that the user is kept within the field of vision. Hence, it is conceived that, when the user uses this system, there is no obstacle between the camera 20 and the user and the user body is located in front (on the side of the camera 20) as compared with another object (a wall, for example). Therefore, it is estimated that an object located in the proximity of the distance from the camera 20 to the video image display apparatus 40 and in the front side (the side of the camera 20) thereof inside the distance image D be a part of the user body. In a more specific example, it can be estimated that, of the objects seen inside the distance image D, an object with the distance from the camera 20 being shorter than that of the video image display apparatus 40 be a hand of the user. Therefore, the body position acquisition block 52 identifies, as a part of attention, an object existing within a range up to a predetermined distance as viewed from the camera 20. The predetermined distance in this case may be determined in accordance with a distance from the camera 20 to the video image display apparatus 40.

In this example, the body position acquisition block 52 determines, for each unit area inside the distance image D, whether the object seen in that unit area is a part of the user body. Here, the unit area may be one of the pixels making up the distance image D or a pixel block including two or more adjacent pixels. If the distance between the object seen in the unit area of attention and the camera 20 is included in a predetermined distance range, the body position acquisition block 52 estimates that this object is a part of the user body, thereby acquiring the information of the position with reference to the camera 20. It should be noted that, if the unit area includes two or more pixels, the distance up to the object seen in the unit area may be a typical value (an average value or a mode value) of the distances computed for the two or more pixels included in the unit area.

Further, the body position acquisition block 52 may execute the above-mentioned determination, inside a distance image D, with a predetermined area determined in accordance with the position of the video image display apparatus 40 being as the subject of processing, on a unit area included in this predetermined area. Since the position of the video image display apparatus 40 is equivalent to the user head, it is difficult to assume that there be a part of the user body at a position away from the video image display apparatus 40 by more than a predetermined distance in the real space. Therefore, it is practicable for the body position acquisition block 52 to set only the predetermined area including the position of the video image display apparatus 40 inside the distance image D as the subject of processing and exclude objects seen in other areas (areas away from the position of the video image display apparatus 40) from the subject of processing, thereby preventing the erroneous identification of the body of a person other than the user as a part of the user body, for example. In addition, the body position acquisition block 52 may identify the position of the user body by identifying an area corresponding to the user body by executing image analysis on a taken image captured by the camera 20.

It should be noted that, in the description made above, the body position acquisition block 52 itself identifies the relative position of a part of attention by use of a distance image; however, it is also practicable for the body position acquisition block 52 of the information processing apparatus 10 to acquire the positional information of a part of attention computed by an external apparatus.

The video image display control block 53 generates a video image indicative of a situation inside a virtual space and supplies the generated video image to the relay apparatus 30. This allows the video image display control block 53 to display the generated video image on the video image display apparatus 40 for the viewing by the user. This video image is a video image indicative of a situation in the direction of line of sight from a viewpoint position arranged inside the virtual space. These viewpoint position and direction of line of sight are determined in accordance with the position and orientation of the video image display apparatus 40 acquired by the apparatus position acquisition block 51. That is, when the user changes the position or the orientation of the head, the position or orientation of the video image display apparatus 40 changes accordingly. Working with the change in the position or the orientation of the video image display apparatus 40, the video image display control block 53 changes the viewpoint position and the direction of line of sight inside the virtual space. Consequently, the user is able to view a scene inside the virtual space that changes in accordance with the movement of the head of the user.

Further, in the present embodiment, a video image generated by the video image display control block 53 is an image that includes an object corresponding to a part of attention whose position is acquired by the body position acquisition block 52. In what follows, an object arranged inside a virtual space in accordance with a part of the user body is referred to as a part object P. To be more specific, the video image display control block 53 arranges a part object P corresponding to a part of attention whose positional information is acquired by the body position acquisition block 52. In this case, the position of arrangement of the part object P is determined in accordance with the relative position of the part of attention with reference to the position of the video image display apparatus 40 which relative position is acquired by the body position acquisition block 52. To be more specific, the video image display control block 53 arranges the part object P at a position inside the virtual space corresponding to the relative position acquired by the body position acquisition block 52 with reference to a viewpoint position and a direction of light of sight that are set inside the virtual space. Consequently, the video image display control block 53 can generate a video image that looks as if a part of the body of the user were existent inside the virtual space.

For a specific example, if the body position acquisition block 52 acquires the positional information of a part of attention for each of unit areas in a distance image D, the video image display control block 53 may arrange, inside the virtual space, part objects P that correspond, one to one, to parts of attention with positional information thereof acquired. In this case, each part object P may include a particle in the case where a situation inside a virtual space is drawn by a particle system. In this setup, if a hand of the user is seen over two or more unit areas inside a distance image D for example, two or more part objects P are arranged inside the virtual space that correspond to the two or more unit areas occupied by the hand of the user. The position of the arrangement of each of these part objects P is determined in accordance with the positional information of the corresponding part of attention, so that this positional information can be determined independently of the other part objects P. Nevertheless, these part objects P have an external view that corresponds to the shape of the hand of the user as a whole. Moreover, determining the position of arrangement of part objects P inside a virtual space by use of the distance information included in a distance image D allows the three-dimensional reproduction of a part of the body of the user although the part is limited to the part of the body in a range seen from the camera 20.

Figure 5:
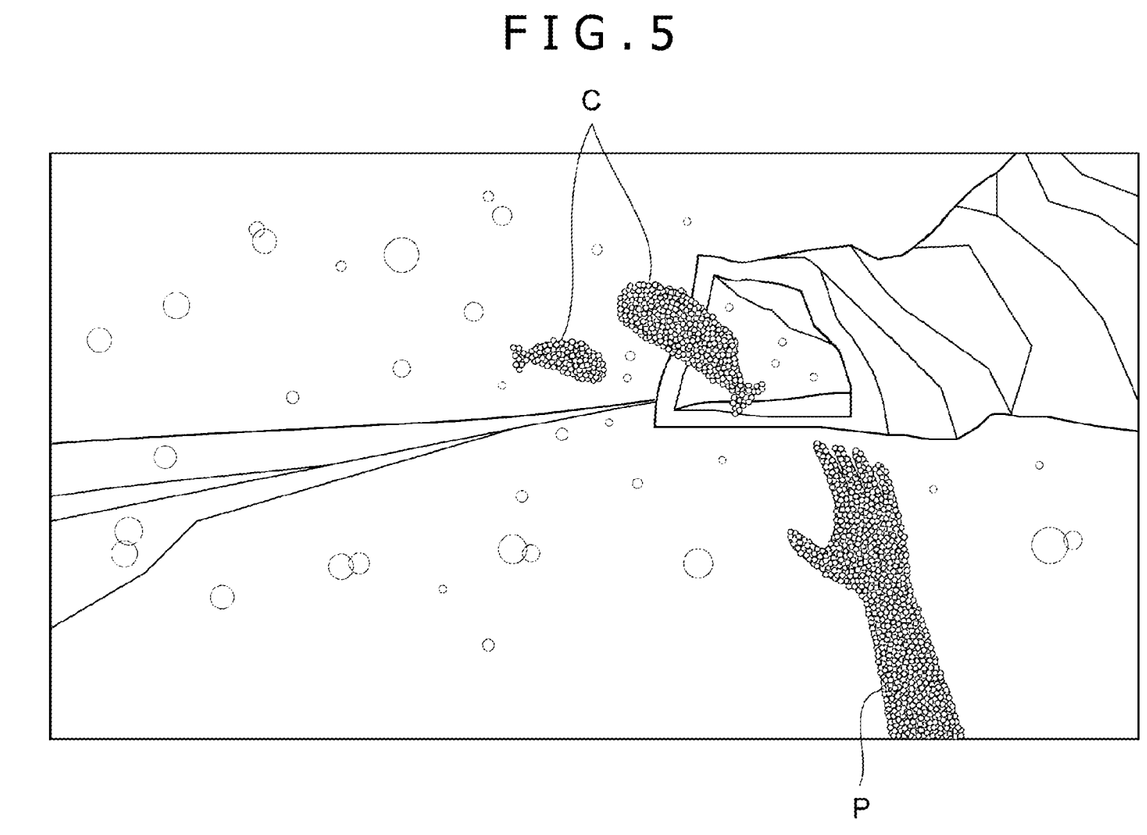
FIG. 5 is a diagram illustrating one example illustrating a video image displayed on a video image display apparatus.

FIG. 5 illustrates a specific example of video images indicative of a situation inside a virtual space in which part objects P corresponding to a hand of the user are arranged. In this diagram, two or more part objects P making up the shape simulating a hand of the user are displayed in the lower right corner, along with character objects C that are arranged in the virtual space. When the user moves the hand, these part objects P move in coordination with the movement.

Further, the part object P arranged in a virtual space interacts with other objects (a character object C, a background object, and so on) arranged in the virtual space. To be more specific, for example, the video image display control block 53 determines whether there is a collision between each part object P and a character object C and, if a collision is found therebetween, causes a change in the external view (color, shape, or position, for example) of the part object P or the character object C. Consequently, the user can realize an interaction in which an object arranged in the virtual space is touched for example by moving a hand for example of the user.

In addition to the case of contact between a part object P and another object, the video image display control block 53 may cause a change in the external view of each object if a change occurs in the distance between the objects. For example, if a character object C arranged in a virtual space approaches a part object P to enter the range of a predetermined distance, the color or shape of the character object C is changed or elements of some particles making up the character object C are moved. This allows the user to sensuously grasp the distance up to the character object C.

Further, the video image display control block 53 may not only display a part object P corresponding to a part of the user body but also display various video images according to user movements. For one example, the body position acquisition block 52 may identify the breathing timing of the user on the basis of not only the position of a part of the user body but also a temporal change of an image taken by the camera 20. A technology is known in which user's inhaling timing and user's exhaling timing are identified by detecting the up and down movements of the user chest on the basis of a temporal change in taken images of the user. By using such a technology, the body position acquisition block 52 may identify the breathing timing of the user and the video image display control block 53 may change the contents of a video image to be displayed on the video image display apparatus 40 in accordance with the identified breathing timing. To be more specific, the video image display control block 53 may display manners in which a predetermined object moves toward a viewpoint position with a user's inhaling timing or a predetermined object moves in the direction away from a viewpoint position with a user's exhaling timing, for example.

It is assumed in the present embodiment that the user be directed toward the camera 20 so as to identify the position of the video image display apparatus 40 and the position of a part of the user body. However, since it is difficult for the user wearing the video image display apparatus 40 to visually recognize the situation of the outside, the user may change the direction of the face of the user in the direction away from the camera 20. Therefore, the video image display control block 53 may display, on the video image display apparatus 40, a guidance image for guiding the direction inside the virtual space corresponding to the direction from the video image display apparatus 40 toward the camera 20 in the real space. To be more specific, this guidance image may be an image of a predetermined object arranged in the virtual space or an indication image indicative of direction. When the user changes the direction of the face of the user into the direction indicated by this guidance image, the user is directed toward the camera 20 in the real space.

Figure 6:
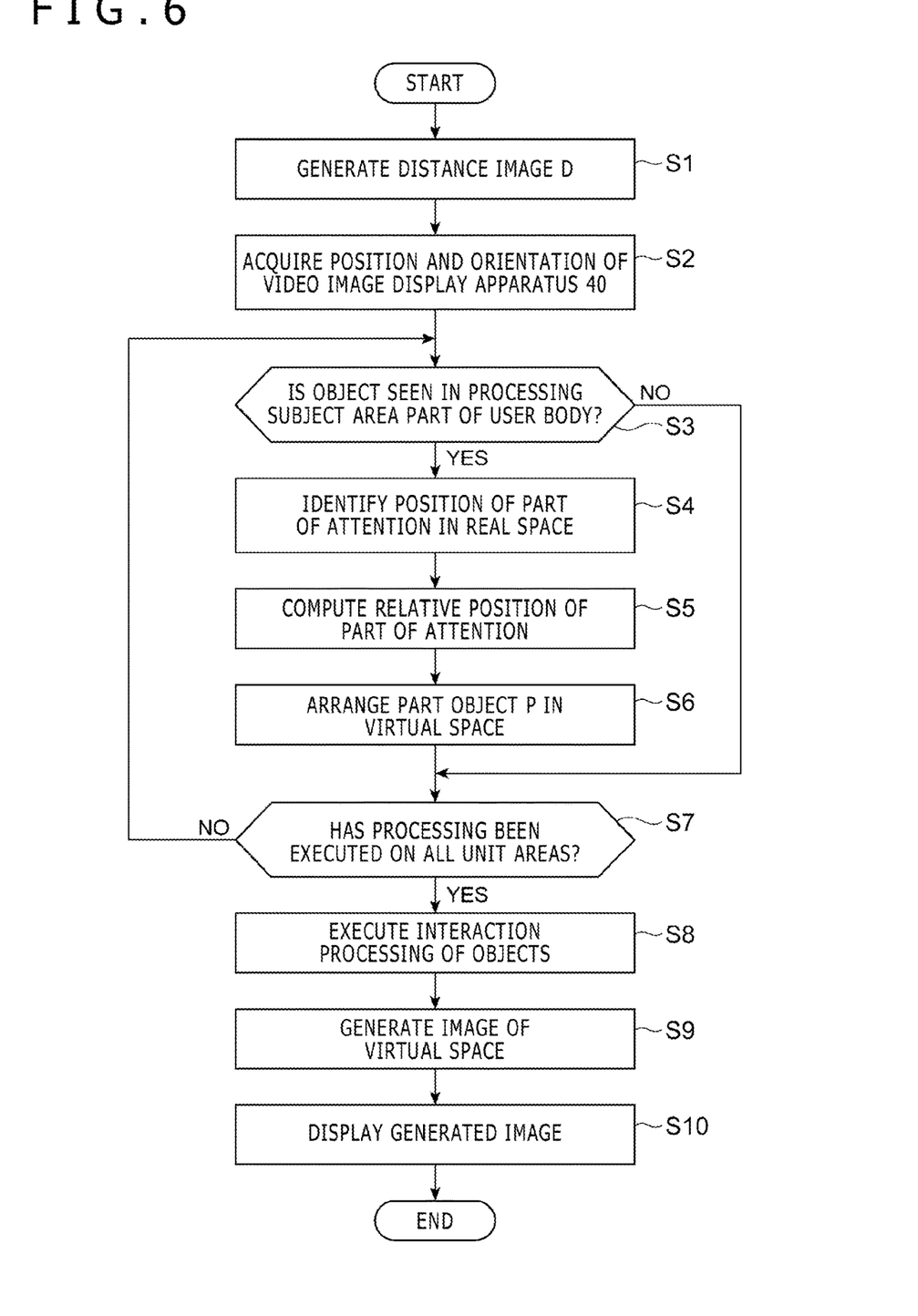
FIG. 6 is a flowchart indicative of one example of a flow of processing that is executed by the information processing apparatus.

The following describes one example of a flow of the processing to be executed by the information processing apparatus 10 practiced as the present embodiment with reference to the flowchart depicted in FIG. 6. The processing illustrated by the following processing flow is executed every time the frames of a video image are updated with a frequency corresponding to a frame rate of the video image to be displayed by the video image display apparatus 40, for example.

First, on the basis of a most recent taken image captured by the camera 20, a distance image D at the point of time of processing execution is generated (S1). Next, on the basis of the distance image D and the measurement results of the motion sensor 44, the apparatus position acquisition block 51 acquires the position and orientation of the video image display apparatus 40 (S2).

Next, the processing depicted below is executed on each unit area included in the distance image D as the area subject to processing. That is, on the basis of a distance from the camera 20 to an object seen in the area subject to processing for example, the body position acquisition block 52 determines whether or not this object is a part of the user body (S3). If this object is found not to be a part of the user body, the processing on this area subject to processing comes to an end and the processing flow goes to S7. On the other hand, if this object is found to be a part of the user body (a part of attention), then, on the basis of the position of the area subject to processing in the distance image D and the distance up to the part of attention, the body position acquisition block 52 identifies the position of the part of attention in the real space with reference to the mounting position of the camera 20 (S4). Then, the identified position is converted into a position in the coordinate system with reference to the position and orientation of the video image display apparatus 40 acquired in S2. That is, the relative position of the part of attention is computed with reference to the position of the video image display apparatus 40 (S5). Next, the video image display control block 53 arranges the part object P at the position in the virtual space that is determined in accordance with the relative position computed in S5 (S6), upon which the processing flow goes to S7.

Next, it is determined whether or not the processing has been executed on all unit areas as the areas subject to processing (S7). If any unprocessed unit area is found, then the processing operations of S3 through S6 are repeated on the unit area as a new area subject to processing. When all the unit areas have been processed, it indicates that the part object P has been arranged for each of the unit areas corresponding to the parts of attention in the virtual space. In this state, the video image display control block 53 executes interaction processing between the part objects P and other objects arranged in the virtual space (S8). The interaction processing herein denotes the processing of updating the position and external view of each object in accordance with the collision or the distance change between objects arranged in the virtual space. Next, the video image display control block 53 generates an image indicative of a situation in the virtual space as viewed from a viewpoint position in the direction of light of sight, the viewpoint position and the direction of line of sight corresponding to the position and orientation acquired in S2, (S9) and outputs the data of the generated image to the relay apparatus 30, thereby displaying the data on the video image display apparatus 40 (S10).

Repeating the processing described above every time the frames of a video image are updated allows the user to view a video image indicative of the movement of the part objects P inside the virtual space in coordination with the movement of a part of the user body in a real-time manner. Consequently, the user is able to execute interactions such as touching the character object C by virtually moving the body of the user inside the virtual space.

In addition, in the processing described above, the processing is executed independently for each of the unit areas in the distance image D and the corresponding part objects P are arranged in the virtual space. Therefore, as compared with a case in which the skeletal framework of an arm of the user is identified and a model corresponding to the identified skeletal framework is arranged in a virtual space, for example, the delay of processing is hardly caused, thereby allowing the arrangement, in a virtual space, of objects forming a shape similar to the shape of the user body with less processing load.

However, it should be noted that, depending upon the processing performance of the information processing apparatus 10, the body position acquisition block 52 may identify a part of the user body more accurately. For example, the body position acquisition block 52 identifies the position of a hand of the user by analyzing a taken image captured by the camera 20 and uses the identified position of the hand and the position of the video image display apparatus 40 (namely, the position of the head of the user), thereby estimating the positions of the shoulder and arm of the user. This positional estimation can be realized by use of a known inverse kinematics technology. Then, in accordance with the estimated position of an arm for example, the video image display control block 53 arranges a prepared object simulating a human arm into a virtual space. According to this processing, a more real object corresponding to a part of the user body can be displayed.

Embodiments of the present invention are not limited to the embodiment described so far. For example, in the description above, a stereo camera is used as a distance image sensor. However, the distance image sensor is not limited to a stereo camera; it is also practicable to use any other types of distance image sensors such as time-of-flight (TOF) and pattern radiation so as to generate a distance image D, for example.

Further, the processing of correcting video images or the like that is realized by the relay apparatus 30 in the above description may be realized by the information processing apparatus 10. Conversely, at least some of the processing operations that are realized by the information processing apparatus 10 in the above description may be realized by the relay apparatus 30. Still further, some of the processing operations that are realized by the relay apparatus 30 in the above description may be realized by an integrated circuit built in the video image display apparatus 40. Yet further, if the processing operations that are realized by the relay apparatus 30 in the above description are all realized by the information processing apparatus 10 or the video image display apparatus 40, then the relay apparatus 30 may not be arranged.

REFERENCE SIGNS LIST

Video image display system, 10 Information processing apparatus, 11 Control block, 12 Storage block, 13 Interface block, 20 Distance image sensor, 30 Relay apparatus, 40 Video image display apparatus, 41 Video image display device, 42 Optical device, 43 Light-emitting device, 44 Motion sensor, 45 Communication interface, 51 Apparatus position acquisition block, 52 Body position acquisition block, 53 Video image display control block.

The invention claimed is:

1. An information processing apparatus connected to a video image display apparatus worn on a head of a user, the information processing apparatus comprising:
   a position acquisition block configured to acquire information of a relative position of at least a part of a body of the user with reference to a position of the video image display apparatus,
   wherein the video image display apparatus is a non-transmissive head-mounted display (HMD) that blocks vision of the user outside the video image display apparatus; and
   a display control block configured to display, on the video image display apparatus, a video image indicative of a situation in which an object corresponding to the part is arranged at a position in a virtual space, the position being determined in accordance with the acquired relative position,
   wherein the object corresponding to the part appears as a simulation of the part of the body drawn by a particle system and comprising a plurality of particles.

2. The information processing apparatus according to claim 1, further comprising:
   an apparatus position acquisition block configured to acquire information of a position and an orientation of the video image display apparatus in a real space,
   wherein the relative position of the part is identified on the basis of the acquired position and orientation of the video image display apparatus.

3. The information processing apparatus according to claim 2,
   wherein the information processing apparatus is connected to a distance image sensor, and
   the relative position of the part is identified on the basis of the acquired position and orientation of the video image display apparatus and a result of detection of the part by the distance image sensor.

4. The information processing apparatus according to claim 3,
   wherein the position acquisition block determines for each of a plurality of unit areas included in a distance image obtained by the distance image sensor whether or not an object positioned in the unit area concerned corresponds to a part of the user body and, if the object is found corresponding to the part of the user body, acquires information of a relative position of the part concerned, and
   the display control block arranges, for each of the parts whose relative position information is acquired by the position acquisition block, an object corresponding to the part concerned into the virtual space.

5. A video image display method for having a video image display apparatus worn on a head of a user display a video image, the video image display method comprising:
   acquiring information of a relative position of at least a hand of the user with reference to a position of the video image display apparatus,
   wherein the video image display apparatus is a non-transmissive head-mounted display (HMD) that blocks vision of the user outside the video image display apparatus; and
   displaying, on the video image display apparatus, a video image indicative of a situation in which an object corresponding to the hand is arranged at a position in a virtual space, the position being determined in accordance with the acquired relative position,
   wherein the object corresponding to the hand appears as a simulation of the hand drawn by a particle system and comprising a plurality of particles.

6. A program for a computer connected to a video image display apparatus worn on a head of a user, the program comprising:
   by a position acquisition block, acquiring information of a relative position of at least a part of a body of the user with reference to a position of the video image display apparatus,
   wherein the video image display apparatus is a non-transmissive head-mounted display (HMD) that blocks vision of the user outside the video image display apparatus; and
   by a display control block, displaying, on the video image display apparatus, a video image indicative of a situation in which an object corresponding to the part is arranged at a position in a virtual space, the position being determined in accordance with the acquired relative position,
   wherein the object corresponding to the part appears as a simulation of the part of the body drawn by a particle system and comprising a plurality of particles.

7. A non-transitory computer-readable information storage medium storing a program for a computer connected to a video image display apparatus worn on a head of a user, the program comprising:
   by a position acquisition block, acquiring information of a relative position of at least a part of a body of the user with reference to a position of the video image display apparatus,
   wherein the video image display apparatus is a non-transmissive head-mounted display (HMD) that blocks vision of the user outside the video image display apparatus; and
   by a display control block, displaying, on the video image display apparatus, a video image indicative of a situation in which an object corresponding to the part is arranged at a position in a virtual space, the position being determined in accordance with the acquired relative position,
   wherein the object corresponding to the part appears as a simulation of the part of the body drawn by a particle system and comprising a plurality of particles.

* * * * *